(12) United States Patent
Jiang et al.

(10) Patent No.: US 12,671,017 B2
(45) Date of Patent: Jun. 30, 2026

(54) THERMAL-PROTECTIVE TRANSIENT VOLTAGE SUPPRESSOR (TVS)

(71) Applicant: XIAMEN SET ELECTRONICS CO., LTD., Xiamen (CN)

(72) Inventors: Jianguo Jiang, Xiamen (CN); Xianggui Zhang, Xiamen (CN); Luquan Luo, Xiamen (CN); Yuecong Tang, Xiamen (CN)

(73) Assignee: XIAMEN SET ELECTRONICS CO., LTD., Xiamen (CN)

( * ) Notice: Subject to any disclaimer, the term of this patent is extended or adjusted under 35 U.S.C. 154(b) by 224 days.

(21) Appl. No.: 18/695,841

(22) PCT Filed: Dec. 14, 2022

(86) PCT No.: PCT/CN2022/138939
§ 371 (c)(1),
(2) Date: Mar. 27, 2024

(87) PCT Pub. No.: WO2023/109852
PCT Pub. Date: Jun. 22, 2023

(65) Prior Publication Data
US 2024/0387078 A1 Nov. 21, 2024

(30) Foreign Application Priority Data
Dec. 14, 2021 (CN) .......................... 202123135582.9

(51) Int. Cl.
H01C 1/02 (2006.01)
H02H 9/00 (2006.01)

(52) U.S. Cl.
CPC ............... H01C 1/02 (2013.01); H02H 9/005 (2013.01)

(58) Field of Classification Search
CPC . H01C 1/02; H01C 7/12; H01C 7/126; H01H 37/761; H01H 2037/763;
(Continued)

(56) References Cited

U.S. PATENT DOCUMENTS

| | | | | |
|---|---|---|---|---|
| 5,297,008 A | * | 3/1994 | Estes | H05K 3/3426 361/776 |
| 5,318,926 A | * | 6/1994 | Dlugokecki | H01L 23/24 257/E23.125 |

(Continued)

FOREIGN PATENT DOCUMENTS

| | | | | | |
|---|---|---|---|---|---|
| CN | 209434871 U | * | 9/2019 | | H02H 9/00 |
| CN | 209982055 U | * | 1/2020 | | |

(Continued)

OTHER PUBLICATIONS

Machine translation of Zhang et al. Chinese Patent Document CN 209434871 U Sep. 2019 (Year: 2019).*

(Continued)

*Primary Examiner* — Kevin J Comber
(74) *Attorney, Agent, or Firm* — Bayramoglu Law Offices LLC

(57) ABSTRACT

A thermal-protective transient voltage suppressor (TVS) includes a TVS assembly, a housing, a frame, a cover plate, and a pin, where the TVS assembly is provided in the frame; the TVS assembly is electrically connected to the pin; the housing and the cover plate form an accommodation chamber for accommodating the frame; the pin extends out of the accommodation chamber, and an extended part of the pin is provided with a mounting portion for surface mount soldering; a spacing limit post is provided on the cover plate; and the frame abuts against the spacing limit post, such that the mounting portion of the pin and the TVS assembly are spaced apart by a preset distance. The spacing limit post on the cover plate of the thermal-protective TVS limits the frame provided with the TVS assembly, thereby increasing a distance between the mounting portion of the pin and the TVS assembly.

11 Claims, 6 Drawing Sheets

(58) Field of Classification Search
CPC ....... H01L 21/50; H01L 23/053; H01L 23/10;
H01L 23/16; H01L 23/62; H01T 1/14;
H02H 9/005
USPC ......................................................... 361/124
See application file for complete search history.

(56) References Cited

U.S. PATENT DOCUMENTS

| | | |
|---|---|---|
| 2012/0327607 A1 | 12/2012 | Lin et al. |
| 2019/0295792 A1* | 9/2019 | Li .......................... H01C 7/126 |
| 2020/0036185 A1* | 1/2020 | Tsovilis ................... H02H 9/06 |

FOREIGN PATENT DOCUMENTS

| | | |
|---|---|---|
| CN | 211700247 U | 10/2020 |
| CN | 216719925 U | 6/2022 |
| CN | 216720901 U | 6/2022 |
| WO | 2020155649 A1 | 8/2020 |

OTHER PUBLICATIONS

Machine translation of Luo et al. Chinese Patent Document CN
209982055 U Jan. 2020 (Year: 2020).*

* cited by examiner

THERMAL-PROTECTIVE TRANSIENT VOLTAGE SUPPRESSOR (TVS)

CROSS REFERENCE TO THE RELATED APPLICATIONS

This application is the national phase entry of International Application No. PCT/CN2022/138939, filed on Dec. 14, 2022, which is based upon and claims priority to Chinese Patent Application No. 202123135582.9, filed on Dec. 14, 2021, the entire contents of which are incorporated herein by reference.

TECHNICAL FIELD

The present disclosure relates to the technical field of surge protection circuits, and in particular to a thermal-protective transient voltage suppressor (TVS).

BACKGROUND

As an overvoltage protection device, a transient voltage suppressor (TVS) is mainly used to discharge a surge current and accurately suppress a voltage.

In existing markets, many large devices are provided on a printed circuit board (PCB) of a terminal. The large devices near the TVS are prone to heat absorption, such that heat of a patch electrode on the TVS is transferred. In response to miniaturization, compaction and integration of the thermal-protective TVS in the markets, due to a high heat capacity of the TVS, the patch-type TVS is attached on a surface of the PCB. Consequently, heat in reflow soldering is quickly absorbed by the TVS in the product, resulting in that heat of the patch electrode out of the product cannot make a solder paste molten. Moreover, in view of a poor flatness and other factors of the patch electrode, open soldering or inveracious soldering of the patch electrode occurs frequently. In addition, thermal-protective low-temperature fusible alloys usually have a melting point of 140-220° C., and this temperature is far lower than 260-280° C. of a high-temperature segment in the reflow soldering. If the insufficient heat of the patch electrode is solved only by improving the temperature of the high-temperature segment, plastic parts become molten easily, and product failures are easily caused in the soldering.

SUMMARY

In view of open soldering or inveracious soldering of a patch electrode of an existing thermal-protective TVS, the present disclosure provides a thermal-protective TVS.

A thermal-protective TVS includes: a TVS assembly, a housing, a frame, a cover plate, and a pin, where the TVS assembly is provided in the frame; the TVS assembly is electrically connected to the pin; the housing and the cover plate form an accommodation chamber for accommodating the frame; the pin extends out of the accommodation chamber, and an extended part of the pin is provided with a mounting portion for surface mount soldering; a spacing limit post is provided on the cover plate; and the frame abuts against the spacing limit post, such that the mounting portion of the pin and the TVS assembly are spaced apart by a preset distance.

In order to reduce conduction of heat from a connecting electrode, the TVS assembly is conductive with the pin through the connecting electrode; and the connecting electrode includes a plurality of bending portions for lengthening a heat transfer path.

Further, the connecting electrode is made of copper, iron, aluminum, a copper alloy, an iron alloy, or an aluminum alloy.

In order to ensure air heat insulation effect, a spacing distance between the mounting portion of the pin and the TVS assembly falls between 0.3 mm and 30 mm.

In order to space the TVS assembly and the mounting portion apart conveniently, and prevent heat of the mounting portion from being absorbed excessively, there are a plurality of spacing limit posts; and a bottom of the spacing limit post is fixed on the cover plate, and a top of the spacing limit post abuts against the frame.

In order to realize thermal protection, a step-like accommodation groove and a semi-open accommodation groove are respectively formed at two sides of the frame; the TVS assembly is provided in the step-like accommodation groove; a reed electrode is provided on the semi-open accommodation groove; a first terminal of the reed electrode is connected to an electrode of the TVS assembly through a fusible alloy, and a second terminal of the reed electrode is electrically connected to the pin; and in response to tripping, the reed electrode bounces up under an elastic force to disconnect from the electrode of the TVS assembly.

In order to realize thermal protection, a step-like accommodation groove and a semi-open accommodation groove are respectively formed at two sides of the frame; the TVS assembly is provided in the step-like accommodation groove; a reed electrode, a slider, and an elastic member are provided on the semi-open accommodation groove; a first terminal of the reed electrode is connected to an electrode of the TVS assembly through a fusible alloy, and a second terminal of the reed electrode is electrically connected to the pin; one end of the elastic member is connected to the frame, and the other end of the elastic member is connected to the slider; and in response to tripping, an elastic force of the elastic member is acted on the slider to push the reed electrode to bounce up and disconnect from the TVS assembly.

In order to reduce conduction of heat from the reed electrode, at least one thermal insulation through hole is formed in the reed electrode.

In order to prevent the fusible alloy from being fused due to hot air circulation in reflow soldering, the pin includes a straight platy main body portion, a first anti-deformation bending portion, the mounting portion, and a second anti-deformation bending portion that are connected sequentially; a cavity matched with the pin is formed in the cover plate; and the second bending portion of the pin is embedded into the cavity of the cover plate.

In order to provide a reverse supporting force for the first pin, and prevent a plastic part from deforming to cause a poor flatness of the mounting portion in the reflow soldering, an included angle between the first bending portion and the main body portion falls between 60° and 89.5°, and an included angle between the second bending portion and the main body portion also falls between 60° and 89.5°.

According to the technical solutions in the present disclosure, the spacing limit post on the cover plate of the thermal-protective TVS limits the frame provided with the TVS assembly, thereby increasing a distance between the mounting portion of the pin and the TVS assembly. Due to a small thermal conductivity of a gas in a spaced portion, while making devices spatially compact, the structure not only fixes the TVS assembly, but also prevents heat of the mounting portion of the pin from being transferred, prevents open soldering or inveracious soldering of the patch electrode, and improves quality and reliability of a product effectively.

REFERENCE NUMERALS

Figure 1:
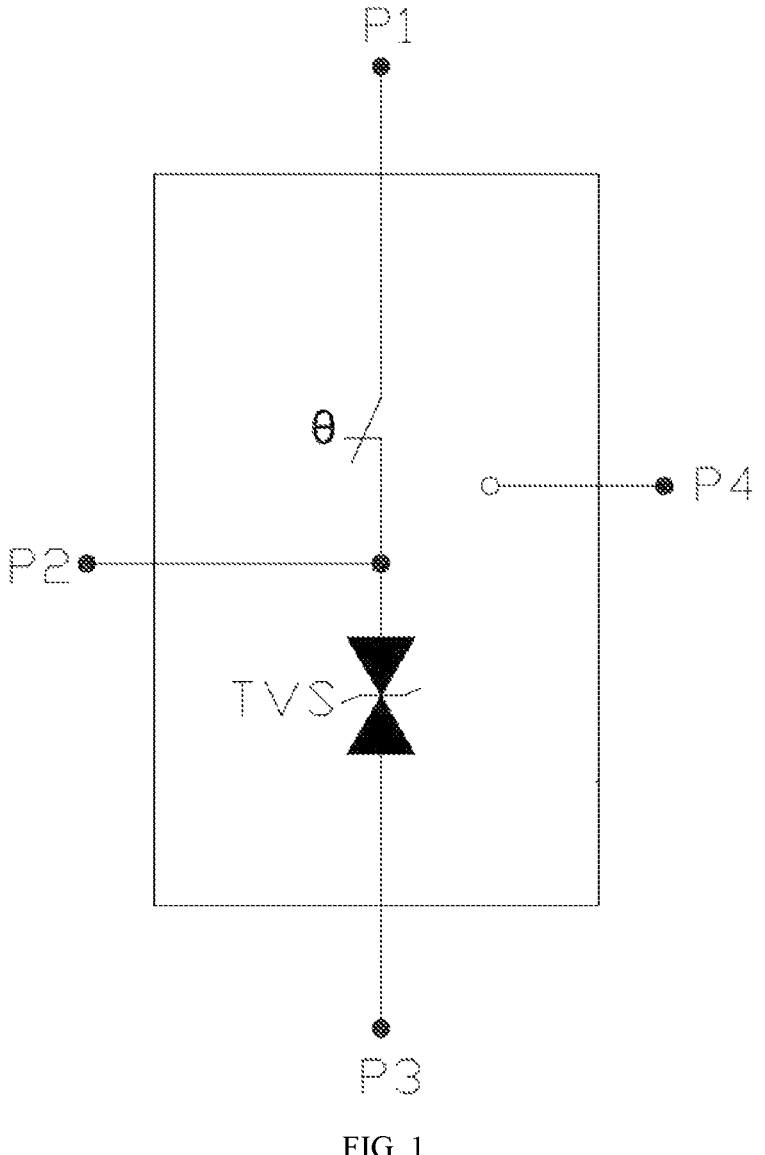
FIG. 1 is a schematic circuit diagram of a thermal-protective TVS according to an embodiment of the present disclosure.

1: TVS assembly, 2: housing, 3: frame, 4: cover plate, 41: spacing limit post, 42: cavity, 5: pin, 51: main body portion, 52: first bending portion, 53: mounting portion, 54: second bending portion, 6: connecting electrode, 7: reed electrode, 71: thermal insulation through hole, 8: elastic member, and 9: slider.

DETAILED DESCRIPTION OF THE EMBODIMENTS

To make the above objectives, features and advantages of the present disclosure more comprehensible, the specific implementations of the present disclosure are clearly and completely described below with reference to the drawings. Obviously, the specific details described below are only part of the embodiments of the present disclosure, and the present disclosure may also be implemented in many other embodiments different from those herein. All other embodiments obtained by those of ordinary skill in the art based on the embodiments of the disclosure without creative efforts shall fall within the protection scope of the present disclosure.

It should be noted that, when a component is fixed to another component, the component may be fixed to the other component directly or via an intermediate component. When a component is connected to another component, the component may be connected to the another component directly or via an intermediate component. The terms "vertical", "horizontal", "left", "right", and similar terms used herein are just for illustrative purposes, and do not mean sole implementations.

Unless otherwise defined, all technical and scientific terms used in the specification have the same meaning as commonly understood by those skilled in the technical field of the present disclosure. The terms used in the specification of the present disclosure are merely for the purpose of describing specific embodiments, rather than to limit the present disclosure.

In an embodiment, referring to FIG. 1 to FIG. 9, a thermal-protective TVS includes TVS assembly 1, housing 2, frame 3, cover plate 4, and pin 5. The TVS assembly 1 is provided in the frame 3. The TVS assembly 1 is electrically connected to the pin 5. The housing 2 and the cover plate 4 form an accommodation chamber for accommodating the frame 3. The pin 5 extends out of the accommodation chamber, and an extended part of the pin 5 is provided with mounting portion 53 for surface mount soldering. Spacing limit post 41 is provided on the cover plate 4. The frame 3 abuts against the spacing limit post 41, such that the mounting portion 53 of the pin 5 and the TVS assembly 1 are spaced apart by a preset distance. There are four pins 5 in the embodiment.

According to the technical solutions in the present disclosure, the spacing limit post 41 on the cover plate 4 of the thermal-protective TVS limits the frame 3 provided with the TVS assembly 1, thereby increasing a distance between the mounting portion 53 of the pin 5 and the TVS assembly 1. Due to a small thermal conductivity of a gas in a spaced portion, while making devices spatially compact, the structure not only fixes the TVS assembly 1, but also prevents heat of the mounting portion 53 of the pin 5 from being transferred, prevents open soldering or inveracious soldering of the patch electrode, and improves quality and reliability of a product effectively.

Figure 2:
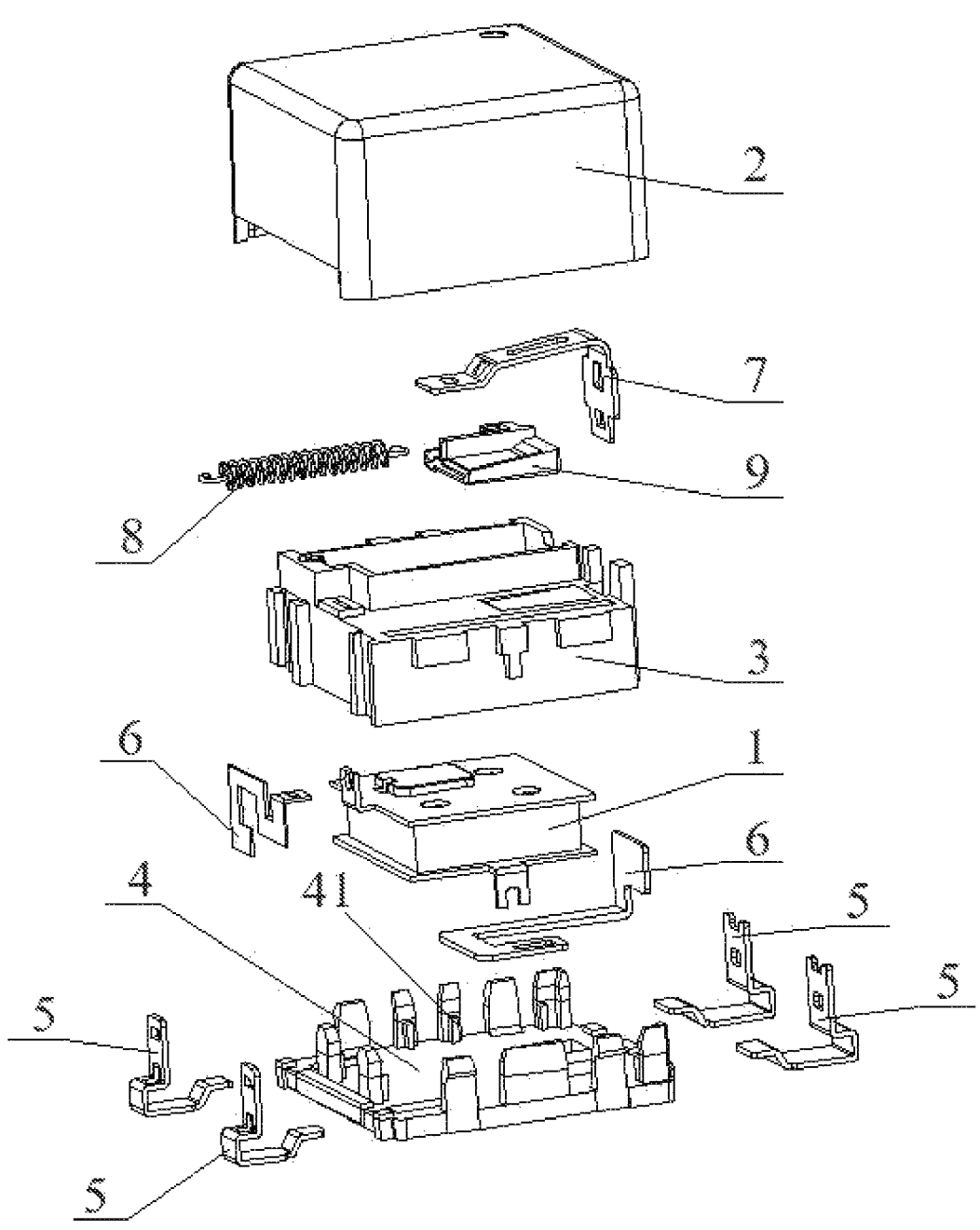
FIG. 2 is a schematic exploded view of a thermal-protective TVS according to an embodiment of the present disclosure.

Referring to FIG. 2, on the basis of the embodiment, in order to reduce conduction of heat from connecting electrode 6, the TVS assembly 1 is conductive with the pin 5 through the connecting electrode 6. The connecting electrode 6 includes a plurality of bending portions for lengthening a heat transfer path. In the embodiment, there are two connecting electrodes 6.

It is to be noted that the bending portion may be concentric-square-shaped or groove-shaped, and may be configured to lengthen the connecting electrode 6. This reduces thermal conduction performance of the connecting electrode 6, prevents heat from being quickly transferred to the TVS assembly 1, and improves patch soldering quality. Certainly, the bending portion may further be other shapes for lengthening the heat transfer path, and is not limited to the shape in the embodiment.

Specifically, the connecting electrode 6 is made of copper, iron, aluminum, a copper alloy, an iron alloy, or an aluminum alloy. Specifically, the material may be red copper, beryllium copper or phosphor bronze. This material has desirable electrical conduction performance and a small heat-transfer rate. Certainly, the connecting electrode 6 may also be made of other materials.

Specifically, in order to ensure air heat insulation effect, a spacing distance between the mounting portion 53 of the pin 5 and the TVS assembly 1 falls between 0.3 mm and 30 mm. While ensuring heat insulation performance, this distance can keep components compact, and prevent a huge size of the components.

Figure 3:
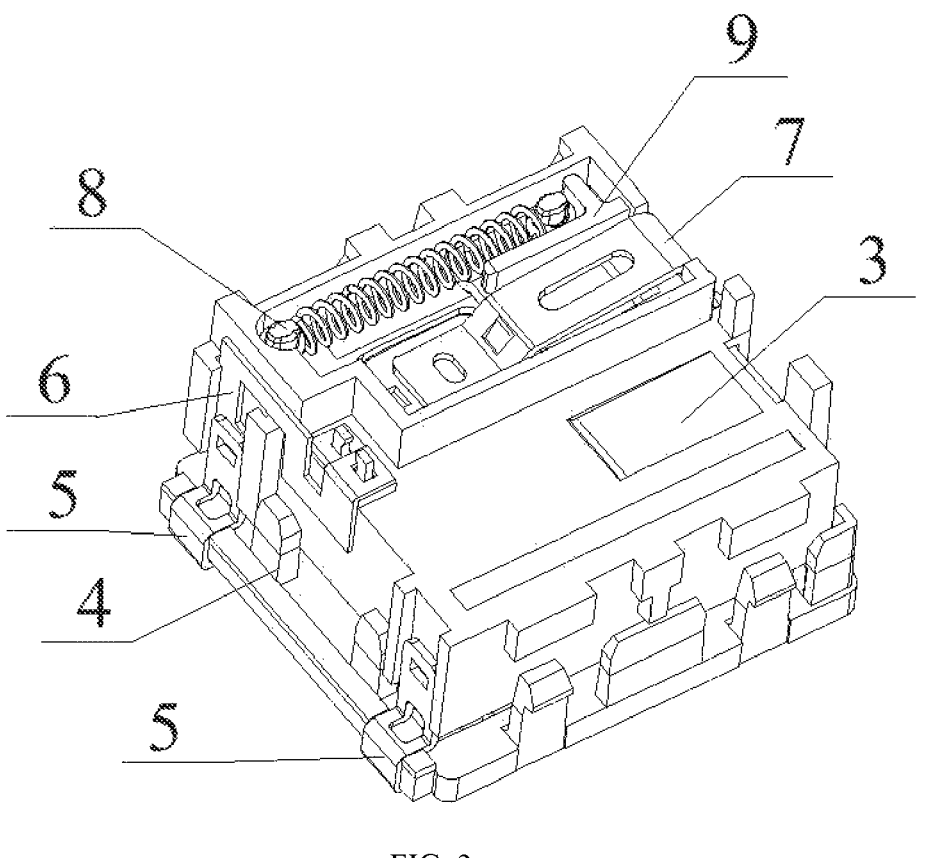
FIG. 3 is a schematic structural view of a thermal-protective TVS without a housing according to the present disclosure.
Figure 4:
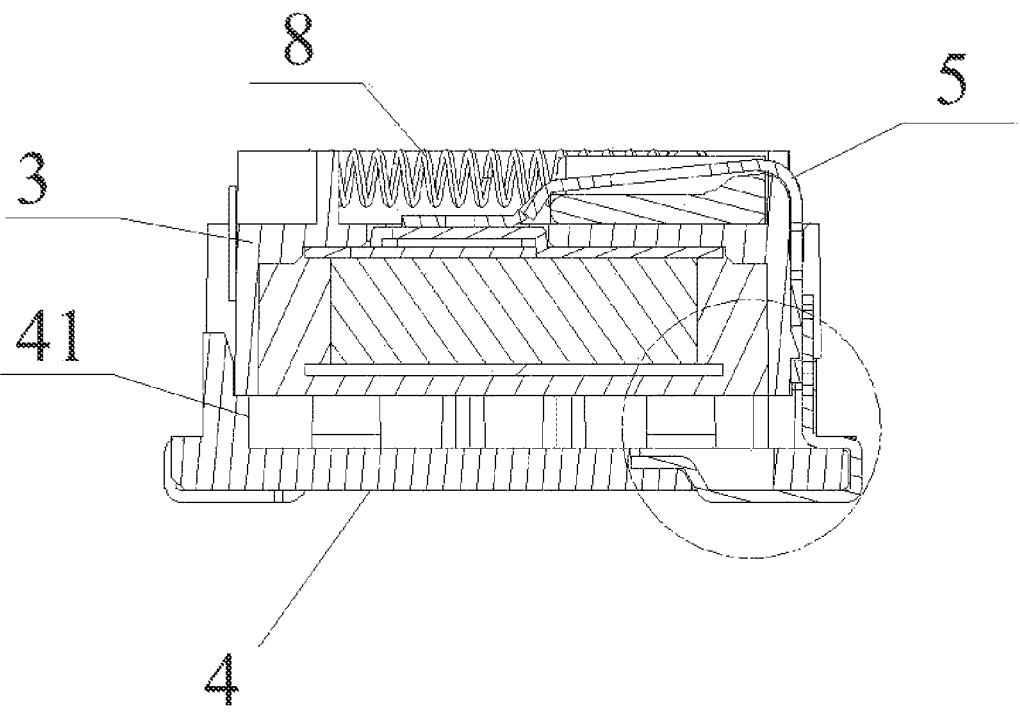
FIG. 4 is a sectional view of FIG. 3.
Figure 9:
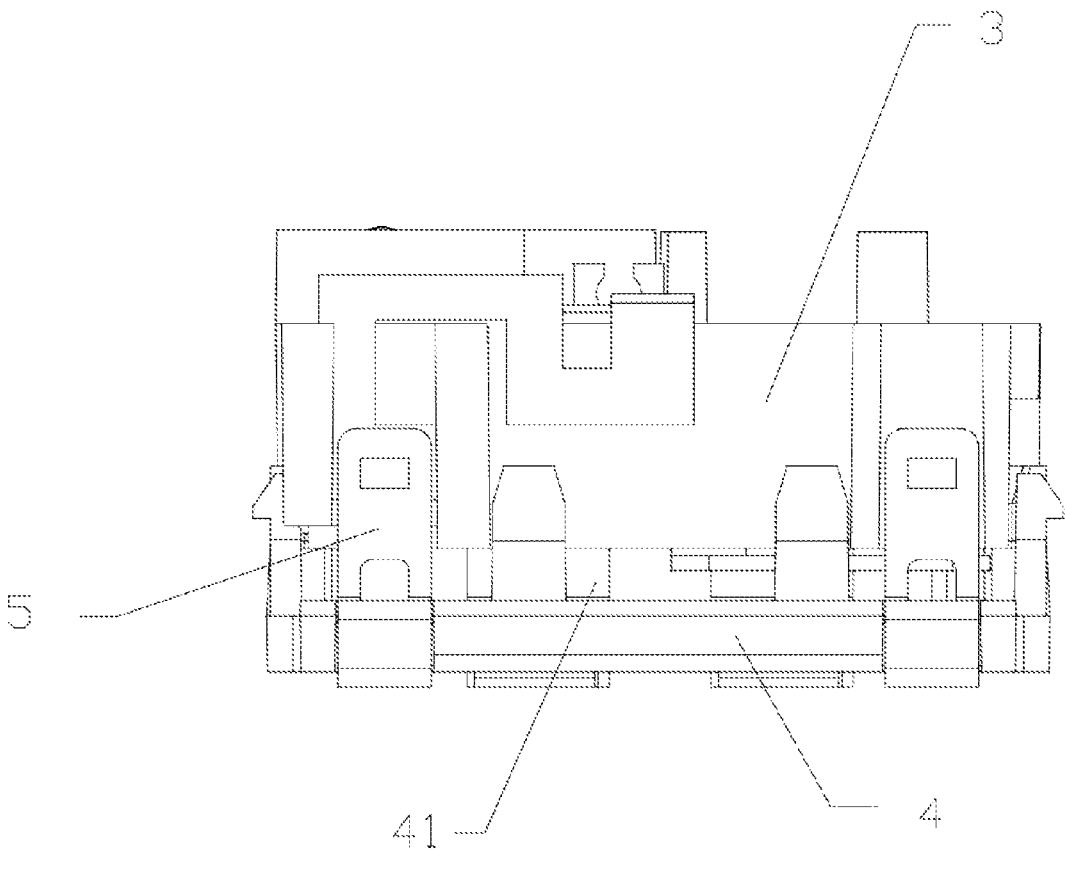
FIG. 9 is a side view of FIG. 3.

As shown in FIG. 3, FIG. 4 and FIG. 9, on the basis of the embodiment, in order to space the TVS assembly 1 and the mounting portion 53 apart conveniently, and prevent heat of the mounting portion 53 from being absorbed excessively, there are a plurality of spacing limit posts 41. A circle of fasteners for clamping with the housing 2 are provided on the cover plate 4. The spacing limit posts 41 are respectively provided on inner sidewalls of the fasteners, and are cylindrical. A bottom of the spacing limit post 41 is fixed on the cover plate 4, and a top of the spacing limit post 41 abuts against the frame 3.

Certainly, the spacing limit post 41 may also be provided at other positions, provided that the mounting portion 53 of the pin 5 and the TVS assembly 1 can be spaced apart by the preset distance. The shape and position of the spacing limit post are not limited in the embodiment.

Referring to FIG. 3, in a first embodiment of the present disclosure, in order to realize thermal protection, a step-like accommodation groove and a semi-open accommodation groove are respectively formed at two sides of the frame 3. The TVS assembly 1 is provided in the step-like accommodation groove. Reed electrode 7 is provided on the semi-open accommodation groove. A first terminal of the reed electrode 7 is connected to an electrode of the TVS assembly 1 through a fusible alloy, and a second terminal of the reed electrode 7 is electrically connected to the pin 5. In response to tripping for thermal protection, the TVS assembly 1 absorbs heat to quickly fuse the fusible alloy, and the reed electrode 7 bounces up under an elastic force to disconnect from the electrode of the TVS assembly 1. This realizes a protective action.

In a second embodiment of the embodiment, in order to realize thermal protection, a step-like accommodation groove and a semi-open accommodation groove are respectively formed at two sides of the frame 3. The TVS assembly 1 is provided in the step-like accommodation groove. Reed electrode 7, slider 9, and elastic member 8 are provided on the semi-open accommodation groove. A first terminal of the reed electrode 7 is connected to an electrode of the TVS assembly 1 through a fusible alloy, and a second terminal of the reed electrode 7 is electrically connected to the pin 5. One end of the elastic member 8 abuts against the frame 3, and the other end of the elastic member 8 abuts against the slider 9. In response to tripping for thermal protection, the TVS assembly 1 absorbs heat to quickly fuse the fusible alloy, and an elastic force of the elastic member 8 is acted on the slider 9 to push the reed electrode 7 to bounce up and disconnect from the TVS assembly 1. This realize a protective action. There may be one or two springs.

It is to be understood that the step-like accommodation groove is configured to accommodate the TVS assembly 1, and limit the connecting electrode 6 of the TVS assembly 1. The step-like accommodation groove includes a sealing material for fixing and sealing the TVS assembly 1. The sealing material is specifically a resin material.

Figure 8:
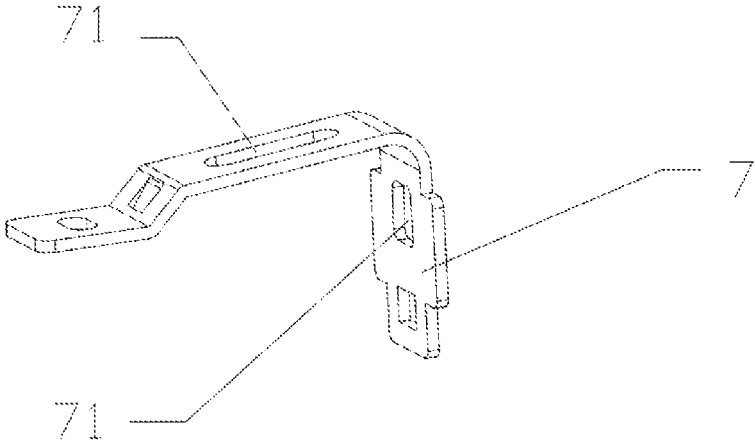
FIG. 8 is a schematic structural view of a reed electrode of a thermal-protective TVS according to an embodiment of the present disclosure.

Referring to FIG. 8, on the basis of the second embodiment, in order to reduce conduction of heat from the reed electrode 7, at least one thermal insulation through hole 71 is formed in the reed electrode 7. With the thermal insulation through hole 71, a sectional area of the reed electrode 7 is reduced, thereby reducing the heat transfer rate. This can prevent heat of the pin 5 from being quickly transferred to the reed electrode 7 in the reflow soldering, and prevent abnormal soldering of the pin 5 as well as an abnormity and a failure of the reed electrode 7 in the reflow soldering.

In the embodiment, in order to prevent the fusible alloy from being fused due to hot air circulation in reflow soldering, the pin 5 includes straight platy main body portion 51, first anti-deformation bending portion 52, the mounting portion 53, and second anti-deformation bending portion 54 that are connected sequentially. Cavity 42 matched with the pin 5 is formed in the cover plate 4. The second bending portion 54 of the pin 5 is embedded into the cavity 42 of the cover plate 4.

Figure 5:
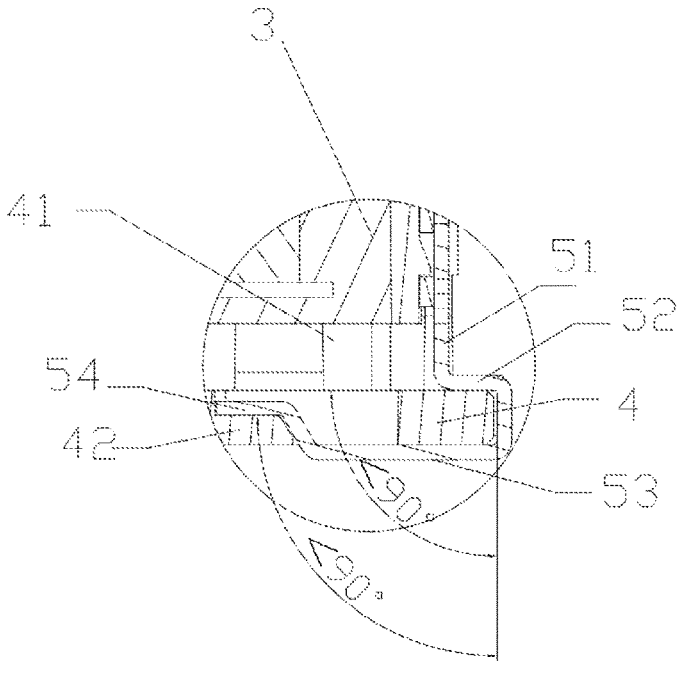
FIG. 5 is a partially enlarged view of FIG. 4.
Figure 6:
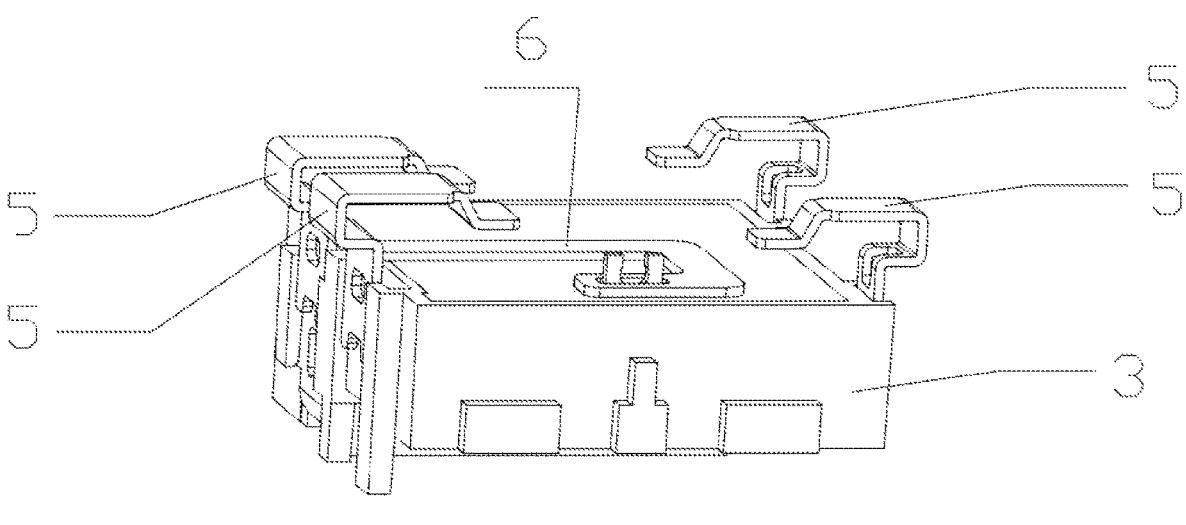
FIG. 6 is a schematic structural view of a thermal-protective TVS without a housing and a cover plate according to the present disclosure.
Figure 7:
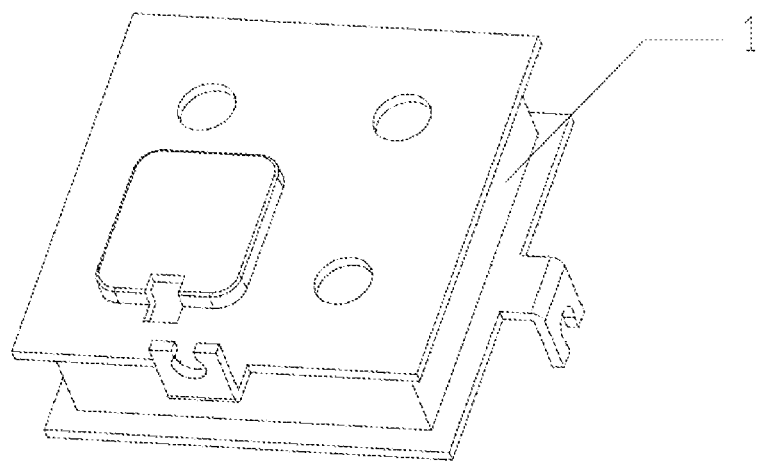
FIG. 7 is a schematic structural view of a TVS assembly of a thermal-protective TVS according to an embodiment of the present disclosure.

Referring to FIG. 5, further, in order to provide a reverse supporting force for the first pin 5, and prevent a plastic part from deforming to cause a poor flatness of the mounting portion 53 in the reflow soldering, an included angle between the first bending portion 52 and the main body portion 51 falls between 60° and 89.5°, and an included angle between the second bending portion 54 and the main body portion 51 also falls between 60° and 89.5°.

In the embodiment, the two connecting electrodes 6 may be a flat lead, may also be a circular lead, and may further be a soft lead. A leading-out terminal of the electrode of the TVS assembly 1 may be directly connected or integrated. Further, the two connecting electrodes 6 may be made of a material with various structures and various heat conductivities, so as to lengthen the heat transfer path, and alleviate heat absorption of the TVS assembly 1.

According to the thermal-protective TVS provided by the present disclosure, by alleviating heat transfer of the electrode, and controlling the flatness of the patch electrode, mutual influences between a low-temperature soldering point and a high-temperature region in the reflow soldering are balanced. This effectively prevents the open soldering or the inveracious soldering of the patch electrode, and improves quality and reliability of the product effectively.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

The above embodiments are only intended to illustrate several implementations of the present disclosure in detail, and they should not be construed as a limitation to the patentable scope of the present disclosure. It should be pointed out that those of ordinary skill in the art may further make several modifications, substitutions and improvements without departing from the concept of the present disclosure, which should be covered by the scope of protection of the present disclosure. Therefore, the protection scope of the present disclosure should be subject to the claims.

What is claimed is:

1. A thermal-protective transient voltage suppressor (TVS), comprising:
   a TVS assembly,
   a housing,
   a frame,
   a cover plate, and
   a pin,
   wherein the TVS assembly is provided in the frame; the TVS assembly is electrically connected to the pin; the housing and the cover plate form an accommodation chamber for accommodating the frame; the pin extends out of the accommodation chamber, and an extended part of the pin is provided with a mounting portion for surface mount soldering; a spacing limit post is provided on the cover plate; and the frame abuts against the spacing limit post, such that the mounting portion of the pin and the TVS assembly are spaced apart by a preset distance.

2. The thermal-protective TVS according to claim 1, wherein the TVS assembly is conductive with the pin through a connecting electrode; and the connecting electrode comprises a plurality of bending portions for lengthening a heat transfer path.

3. The thermal-protective TVS according to claim 2, wherein the connecting electrode is made of copper, iron, aluminum, a copper alloy, an iron alloy, or an aluminum alloy.

4. The thermal-protective TVS according to claim 1, wherein a spacing distance between the mounting portion of the pin and the TVS assembly falls between 0.3 mm and 30 mm.

5. The thermal-protective TVS according to claim 1, wherein a plurality of spacing limit posts are arranged; and a bottom of each of the plurality of spacing limit posts is fixed on the cover plate, and a top of each of the plurality of spacing limit posts abuts against the frame.

6. The thermal-protective TVS according to claim 1, wherein a step-like accommodation groove and a semi-open accommodation groove are respectively formed at two sides of the frame; the TVS assembly is provided in the step-like accommodation groove; a reed electrode is provided on the semi-open accommodation groove; a first terminal of the reed electrode is connected to an electrode of the TVS assembly through a fusible alloy, and a second terminal of the reed electrode is electrically connected to the pin; and in response to tripping, the reed electrode bounces up under an elastic force of the reed electrode to disconnect from the electrode of the TVS assembly.

7. The thermal-protective TVS according to claim 6, wherein at least one thermal insulation through hole is formed in the reed electrode.

8. The thermal-protective TVS according to claim 1, wherein a step-like accommodation groove and a semi-open accommodation groove are respectively formed at two sides of the frame; the TVS assembly is provided in the step-like accommodation groove; a reed electrode, a slider, and an elastic member are provided on the semi-open accommodation groove; a first terminal of the reed electrode is connected to an electrode of the TVS assembly through a fusible alloy, and a second terminal of the reed electrode is electrically connected to the pin; a first end of the elastic member is connected to the frame, and a second end of the elastic member is connected to the slider; and in response to tripping, an elastic force of the elastic member is acted on the slider to push the reed electrode to bounce up and disconnect from the TVS assembly.

9. The thermal-protective TVS according to claim 8, wherein at least one thermal insulation through hole is formed in the reed electrode.

10. The thermal-protective TVS according to claim 1, wherein the pin comprises a straight platy main body portion, a first anti-deformation bending portion, the mounting portion, and a second anti-deformation bending portion, wherein the straight platy main body portion, the first anti-deformation bending portion, the mounting portion, and the second anti-deformation bending portion are connected sequentially; a cavity matched with the pin is formed in the cover plate; and the second anti-deformation bending portion of the pin is embedded into the cavity of the cover plate.

11. The thermal-protective TVS according to claim 10, wherein an included angle between the first anti-deformation bending portion and the straight platy main body portion falls between 60° and 89.5°, and an included angle between the second anti-deformation bending portion and the straight platy main body portion also falls between 60° and 89.5°.

* * * * *